(12) United States Patent
Andrianov et al.

(10) Patent No.: US 9,326,167 B2
(45) Date of Patent: Apr. 26, 2016

(54) RADIO LINK FAILURE REPORT FILTERING

(71) Applicant: NOKIA SOLUTIONS AND NETWORKS OY, Espoo (FI)

(72) Inventors: Anatoly Andrianov, Schaumburg, IL (US); Gyula Bodog, Budapest (HU); Sean Kelley, Hoffman Estates, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/347,368

(22) PCT Filed: Sep. 27, 2012

(86) PCT No.: PCT/EP2012/069058
§ 371 (c)(1),
(2) Date: Mar. 26, 2014

(87) PCT Pub. No.: WO2013/045537
PCT Pub. Date: Apr. 4, 2013

(65) Prior Publication Data
US 2015/0249930 A1 Sep. 3, 2015

Related U.S. Application Data

(60) Provisional application No. 61/541,523, filed on Sep. 30, 2011.

(51) Int. Cl.
H04W 24/00 (2009.01)
H04W 24/02 (2009.01)
H04W 24/08 (2009.01)
H04W 88/08 (2009.01)

(52) U.S. Cl.
CPC .............. *H04W 24/02* (2013.01); *H04W 24/08* (2013.01); *H04W 88/08* (2013.01)

(58) Field of Classification Search
CPC ...... H04W 24/02; H04W 24/08; H04W 88/08
USPC ..................... 455/423, 425, 424, 67.11, 456.6
See application file for complete search history.

(56) References Cited

U.S. PATENT DOCUMENTS

| | | | |
|---|---|---|---|
| 2009/0257353 A1* | 10/2009 | Song et al. .................. | 370/241 |
| 2011/0212720 A1* | 9/2011 | Hamalainen et al. ......... | 455/423 |
| 2011/0242969 A1* | 10/2011 | Dayal ............... | H04W 36/0055 370/225 |
| 2012/0315890 A1* | 12/2012 | Suzuki ................. | H04W 24/10 455/422.1 |

(Continued)

OTHER PUBLICATIONS

International Search Report and Written Opinion dated Jan. 30, 2013 corresponding to International Patent Application No. PCT/EP2012/069058.

(Continued)

*Primary Examiner* — Khai M Nguyen
(74) *Attorney, Agent, or Firm* — Squire Patton Boggs (US) LLP

(57) ABSTRACT

Embodiments of the invention include a method for collecting RLF data in a wireless network. The method may include receiving, by a first radio access node, RLF data related to a connection failure experienced by a UE. The method may then include determining whether the RLF data satisfies at least one condition and, when it is determined that the RLF data satisfies the at least one condition, sending the RLF data to at least one of a second radio access node and an RLF data collection entity. In one embodiment, the RLF data may be received from a second radio access node or the UE.

15 Claims, 5 Drawing Sheets

(56) References Cited

U.S. PATENT DOCUMENTS

2014/0051428 A1* 2/2014 Jung ................ H04W 24/08
 455/422.1
2014/0295840 A1* 10/2014 Keskitalo .......... H04W 36/0061
 455/436

OTHER PUBLICATIONS

Huawei et al., "Remaining Issues regarding RLF Reporting for MDT," 3GPP TSG-RAN WG2 Meeting #73, R2-111239, Taipei/Taiwan, Feb. 21-25, 2011, XP050493739, 3 pages.
ZTE, "RLF Indication & HO Report," R3-112144, 3GPP TSG-RAN3 Meeting #73, Athens, Greece, Aug. 22-26, 2011, XP050541768, 2 pages.
ZTE, "MDT Support for the RLF Report," R2-113818, 3GPP TSG RAN WG2 #75, Athens, Greece, Aug. 22-26, 2011, XP050540165, 3 pages.
3GPP TSG-RAN2, "Reply LS on Managing RLF Reporting Within MDT," R2-112638, 3GPP TSG RAN WG2 Meeting #73bis, Shanghai, China, Apr. 11-15, 2011, vol. SA WG5, XP050530981, 2 pages.
Alcatel-Lucent, "Discussion Paper for RLF Report collection," S5-111927, 3GPP TSG-SA5 (Telecom Management), SA5#77, May 9-13, 2011, Shenzhen, P. R. China, XP050531232, 2 pages.
Nokia Siemens Networks et al., "CR to 37.320 to Clean Up Description of RLF Reporting," R2-113559, 3GPP TSG-RAN2 Meeting #74, Barcelona, Spain, May 9-13, 2011, XP050538996, 4 pages.
3GPP TS 36.331 V9.7.0 (Jun. 2011), Technical Specification, "3rd Generation Partnership Project; Technical Specification Group Radio Access Network; Evolved Universal Terrestrial Radio Access (E-UTRA); Radio Resource Control (RRC); Protocol specification (Release 9)", Jun. 2011, 253 pages.

* cited by examiner

RADIO LINK FAILURE REPORT FILTERING

BACKGROUND

1. Field

Embodiments of the invention relate to wireless communications networks, such as the Universal Mobile Telecommunications System (UMTS) Terrestrial Radio Access Network (UTRAN), and the Long Term Evolution (LTE) Evolved UTRAN (E-UTRAN).

2. Description of the Related Art

Radio link failure (RLF) may occur within radio access technologies, such as UMTS and LTE, when the radio channel signal strength is too weak to continue with communication between a user equipment (UE) and the network. RLF is a local event that is usually detected by the UE immediately and then later by the network nodes. As a result, RLF is conventionally handled locally by the UE, such as through the release of dedicated signaling resources leading to a discontinuation of the communication between the UE and the network.

BRIEF DESCRIPTION OF THE DRAWINGS

For proper understanding of the invention, reference should be made to the accompanying drawings, wherein.

DETAILED DESCRIPTION

Figure 1:
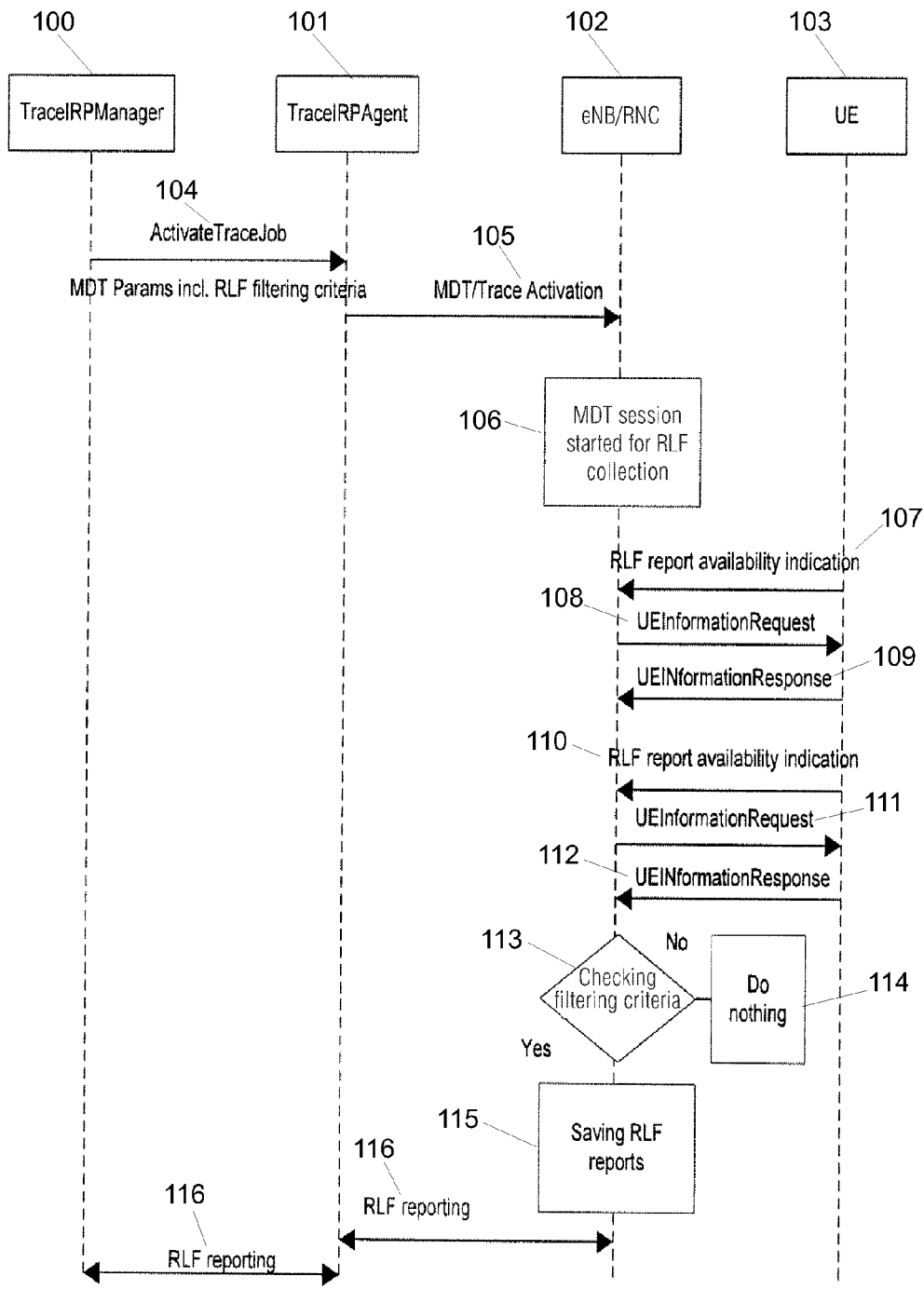
FIG. 1 illustrates a signaling diagram according to one embodiment.

Radio link failure (RLF) reporting was introduced in the third generation partnership project (3GPP) Release 9 under the self organized networks mobility robustness optimization (SON MRO) feature. A user equipment (UE) may experience a connection failure while attempting handoff/handover from cell A to cell B, or connection failure at other times such as when there is a "coverage hole" or when handoff/handover is not triggered early enough. Connection failure while attempting handover is often called handover failure (HOF), and connection failure that occurs at other times, i.e. not while attempting handover, is called RLF. It should be noted, however, that embodiments of the invention apply to both cases, and refers to both cases generically as RLF. Upon experiencing an RLF, the UE may log information about radio conditions, for example a snapshot of the last monitored radio frequency (RF) condition along with other information, which is then stored as a RLF report.

Upon establishing or re-establishing a connection to a cell, the UE indicates the availability of an RLF report to the cell, which then retrieves the RLF report from the UE. If the cell receiving the RLF report is different from the cell where the RLF occurred, it forwards the RLF report back to the cell where the RLF occurred as part of the X2 RLF indication message. The cell where the RLF occurred processes the RLF report as an input to the function/capability responsible for SON MRO, for example a distributed SON MRO algorithm.

In 3GPP Release 10, the additional value of RLF reports to features other than the distributed SON MRO was identified. This resulted in certain enhancements to the RLF reports content, such as the addition of detailed location information of the UE when the RLF event was triggered, e.g. latitude and longitude coordinates, and various cell identifiers such as the last serving cell, that is the identity of the cell where the RLF occurred. The RLF reports can be very useful, for example, in detecting coverage holes, identifying handover failure boundaries, assisting mobility drive tests, etc.

Also, in 3GPP Release 10, certain proposals were made to include the RLF report collection and forwarding functionality into another feature, minimization of drive test (MDT), to enable centralized collection of the RLF reports, for centralized self organized networks (cSON). However, this approach may include some drawbacks that are identified and discussed below.

As of 3GPP Release 10, two versions of the RLF reports exist. The first version is the Release 9 (Rel-9) version that does not contain detailed location information. In Release 9, the last serving cell is indicated by the UE in an RRCConnectionReestablishmentRequest message which means that this information is only collected by a cell following an RRC connection re-establishment attempt. The second version is the Release 10 (Rel-10) version that contains additional attributes, such as location information and cell identifiers making it useful for cSON. In Release 10, the identity of the last serving cell is explicitly included by the UE in the RLF report.

Currently, the UEs are not explicitly configured for RLF reporting. Whenever a UE experiences an RLF, the UE logs the information as defined in 3GPP TS 36.331 and sends it to the network if the network requests it. This also means that, if there is a large number of RLFs, the number of RLF reports collected centrally may be too large for efficient cSON processing.

Therefore, some drawbacks of the approach defined in 3GPP Release 10 are that both Release 9 and Release 10 reports are collected and forwarded, and there is no filtering mechanism defined at the E-UTRAN node-B (eNB) but only an "on/off" flag. Additionally, the content of the RLF report can vary depending, for example, on the release version of the UE, the capabilities of the UE, and factors specific to an RLF occurrence.

Because RLF reports are valuable for cSON purposes, it is important to collect RLF reports at the network management system (NMS) level. It is possible that the RLF reports are collected in a very large area encompassing many cells, a much larger area than just configured for a conventional MDT operation. Therefore, the problem of having too much data can be more common for RLF reports than for MDT, where MDT might be executed for a smaller area. As a result, the possibility exists that the amount of RLF report data is extremely large. At the same time, some RLF reports may not be useful for analysis if the RLF report is missing information that is considered important for a certain type of analysis, or if a certain type of analysis may be more appropriately performed by a central node (e.g., cSON/MDT server) versus a distributed node (eNB) based on the content of the RLF report.

Accordingly, embodiments of the invention provide a solution that decreases the amount of RLF report data, while still maintaining the advantage of having information on available RLF reports. One embodiment of the present invention introduces different filtering criteria for when the eNB should retrieve and/or forward the RLF reports.

According to an embodiment, the filtering criteria may be based on the RLF report content, as discussed below.

As mentioned above, currently there are Release 9 and Release 10 versions of the RLF report. One difference between the two versions is that, for Release 9, the RLF report is required to be processed by the eNB where the connection failure occurred because the stored UE context is needed to assist with interpreting the RLF report. However, for Release 10, the RLF report contains additional information that makes it "self-interpretable" by, for example, a central network entity (e.g., cSON server, MDT server, etc.) which does not have access to the UE context. Therefore, in an embodiment, one of the filtering criteria may include the release version of the RLF report. For example, the release version can be Release 9, Release 10, or any other future releases.

The Release 10 version of the RLF report can optionally include detailed location information (i.e., if the UE supports location information and there was fresh location information available at the UE when the RLF occurred). In most cases, it may be necessary to get only those RLF reports which contain the location where the RLF happened. Therefore, in an embodiment, one of the filtering criteria may include the presence of detailed location information in the report.

In one embodiment, another filtering criterion may include a threshold value for the RSRQ/RSRP measurement value. For instance, if an operator is only interested in certain RSRP/RSRQ levels, a threshold can be given; and, if the reported RSRP/RSRQ value is above the given threshold, the RLF report is not forwarded to the central network entity, such as the cSON server, MDT server, or operations and maintenance (O&M) server. As an example, if there are non-serving cells (e.g., neighboring cells) in the RLF report with RSRP/RSRQ levels above the threshold, then it would appear that the root cause of the RLF was incorrect handover parameters which can be adjusted by distributed SON algorithms in the eNBs. Otherwise, if there are no non-serving cells in the RLF report with RSRP/RSRQ levels above the threshold, then it is likely a coverage hole which may be better to analyze by the central network entity.

In other embodiments, additional filtering criteria may include the carrier frequency of the last serving cell, the Public Land Mobile Network Identity (PLMN) of the last serving cell, or the Tracking Area identity (TAI) of the last serving cell. Accordingly, it will be understood that filtering can apply to any one, or any combination, of the preceding or the following criteria: release version, presence or absence of any attributes, a particular value or range of any attribute.

Therefore, embodiments of the invention include a method for collecting RLF data in a wireless network. The method may include receiving, by a first radio access node, RLF data related to a connection failure experienced by a UE. The method may then include determining whether the RLF data satisfies at least one condition and, based at least in part on the determination that the RLF data satisfies the at least one condition, sending the RLF data to at least one of a second radio access node (e.g. the last radio access node to serve the UE prior to connection failure) and an RLF data collection entity when the RLF data satisfies the at least one condition. In one embodiment, the RLF data may be received from another radio access node (e.g. the radio access node that retrieved the RLF report from the UE) or the UE.

In certain embodiments, the at least one condition may include one or more of the following: the presence of detailed location information in the RLF report, the protocol release version of the RLF report (e.g., release 10, release 11, etc.), the signal strength of the non-serving cells above/below a threshold, the carrier frequency of the last serving cell, PLMN or TAI of the last serving cell, a specific attribute of the RLF report is above/below a threshold, a specific attribute of the RLF report is present/absent, or a specific attribute of the RLF report is set to a particular value.

According to some embodiments, the RLF data collection entity may include a cSON server, a TCE, an MDT server, an O&M server, an NMS, etc. Further, in an embodiment, the method may further include configuring the at least one condition by, for example, an O&M server.

FIG. 1 illustrates a signaling diagram for RLF reporting according to an embodiment of the invention. FIG. 1 shows a system comprising a TraceIRPManager 100, a TraceIRPAgent 101, an eNB/radio network controller (RNC) 102, and a UE 103, for example a mobile terminal. The use of the term eNB/RNC refers to the possibility of the network node being either an eNB or an RNC. In other embodiments of the invention, the network node may incorporate both an eNB and an RNC.

As illustrated in FIG. 1, the TraceIRPManager 100 transmits an ActivateTraceJob message 104 to the TraceIRPAgent 101. It should be noted that the invention is not limited to embodiments that include a TraceIRPAgent; rather, some embodiments may include other entities, such as a cSON server, an MDT server, a TCE, or any other defined or not yet defined network entity.

Returning to FIG. 1, the ActivateTraceJob message 104 may include MDT parameters including RLF filtering criteria. The TraceIRPAgent 101 then transmits an MDT/Trace Activation message 105 to the eNB/RNC 102. As a result, at 106, an MDT session is started for RLF collection. The UE 103 transmits an RLF report availability indication 107 to the eNB/RNC 102. In response, the eNB/RNC 102 transmits a UE information request 108 to the UE 103. Then, UE 103 transmits the UE information response 109 to the eNB/RNC 102 containing the RLF report.

In a variant of the invention, FIG. 1 may be provided with additional, optional, steps. If the RLF report is too large to fit in the UE information response message 109, then the UE 103 can indicate that it has additional information stored. In one embodiment, the UE 103 can indicate that it has additional information by sending an RLF report availability indication at 110. Alternatively, the UE 103 can indicate that it has additional information by setting a flag in the UE information response message 109. When the eNB/RNCB 102 receives an indication that the UE 103 has additional information, the eNB/RNCB 102 can send a UE information request 111, and the UE 103 sends another block of information in a UE information response 112. It will be understood that in some embodiments of the invention steps 110, 111, and 112 may be omitted.

At 113, the eNB/RNC 102 checks the filtering criteria. If the eNB/RNC 102 determines that the filtering criteria have not been met, then the eNB/RNC 102 does not communicate the RLF report to the TraceIRPAgent 101 at 114. If the eNB/RNC 102 determines, however, that the filtering criteria have been met, then at 116, the RLF report is communicated between the eNB/RNC 102, the TraceIRPAgent 101, and the TraceIRPManager 100.

In one embodiment of the invention, FIG. 1 may be provided with an additional, optional, step. Rather than communication of the RLF report happening at step 116 immediately after step 113, there may be a step 115 of saving the RLF report. This could apply, for example, if the RLF reporting to the TraceIRPAgent occurs at set intervals. It will be understood that in some embodiments of the invention step 115 may be omitted.

According to some embodiments, alternative actions are possible in response to the eNB/RNC 102 determining that the filtering criteria have or have not been met. In one embodiment, the alternative actions may involve a second eNB/RNC (not shown in FIG. 1) which was the last eNB to serve the UE 103 prior to connection failure. For example, if the eNB/RNC 102 determines that the filtering criteria have not been met, the RLF report may be communicated between the eNB/RNC 102 and the second eNB, but not communicated between the eNB/RNC 102 and the TraceIRPAgent 101 at 114. If the eNB/RNC 102 determines, however, that the filtering criteria have been met, then at 116, the RLF report may be communicated between the eNB/RNC 102 and the TraceIRPAgent 101, but not communicated between the eNB/RNC 102 and the second eNB/RNC. Alternatively, the eNB/RNC 102 may send RLF reports directly to an RLF data collection entity such as a cSON server, a TCE, an MDT server, an O&M server, or an NMS. In another embodiment, if the eNB/RNC 102 determines that the filtering criteria have not been met, then the eNB/RNC 102 does not communicate the RLF report to either the second eNB/RNC or the TraceIRPAgent 101 at 114. If the eNB/RNC 102 determines, however, that the filtering criteria have been met, then at 116, the RLF report is communicated between the eNB/RNC 102 and at least one of the TraceIRPAgent 101 and the second eNB/RNC.

Figure 2:
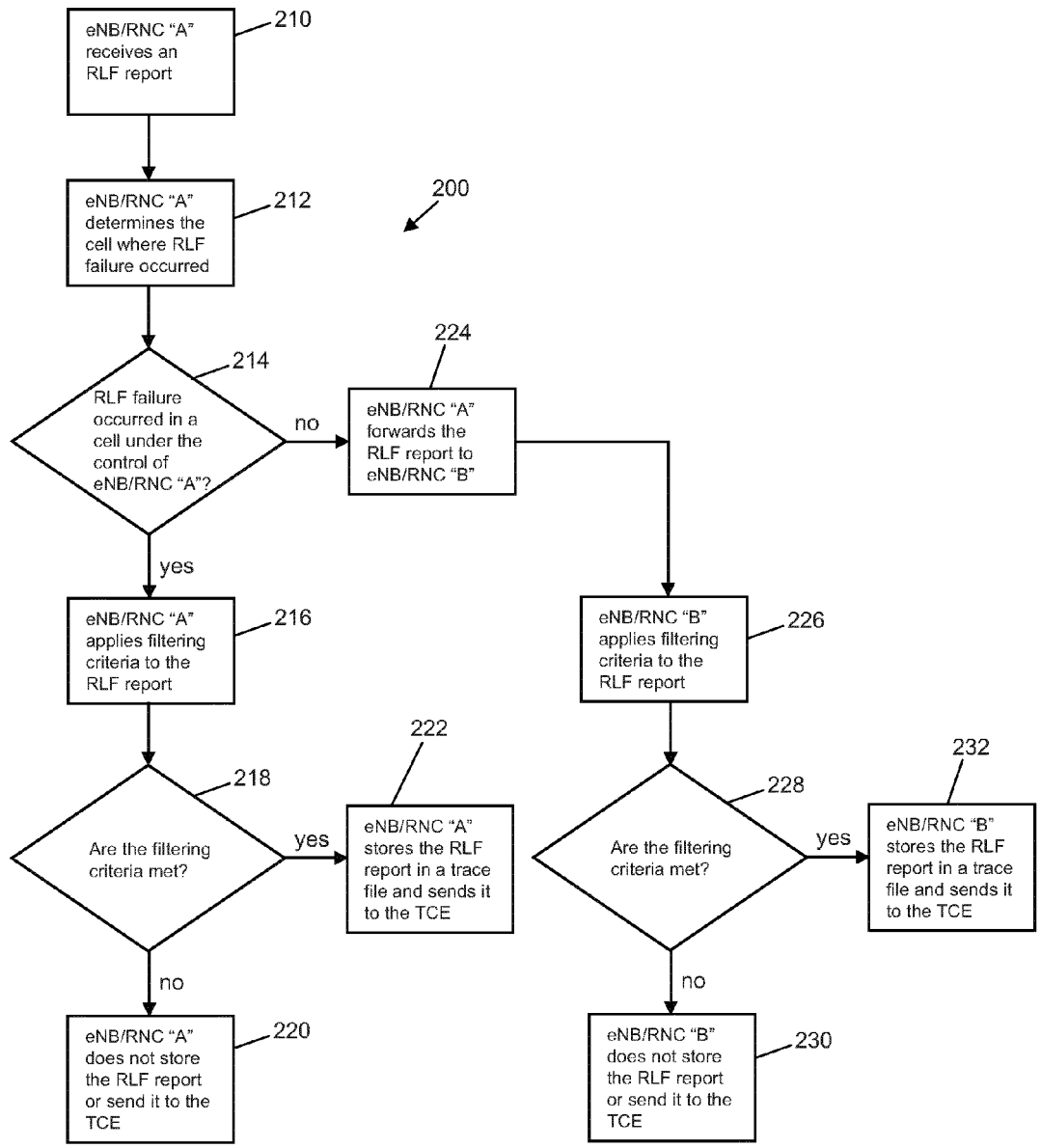
FIG. 2 illustrates a flow diagram of a method according to one embodiment.

Examples of some of these embodiments will be described in the following. Referring now to FIG. 2, this shows a method 200 involving a second eNB/RNC. According to this method, in step 210 an eNB/RNC "A" receives an RLF report, for example by retrieving it from an UE. In step 212, the eNB/RNC "A" determines the cell where the RLF indicated by the RLF report occurred. The eNB/RNC "A" uses the determination of step 212 in step 214 to determine whether the RLF occurred in a cell under the control of eNB/RNC "A". If it is determined that the RLF did occur in a cell under the control of eNB/RNC "A", that is a "yes" decision, then the eNB/RNC "A" applies filtering criteria to the RLF report in step 216. As discussed in the foregoing, a single filter criterion or a number of different filtering criteria may be applied. If the eNB/RNC "A" determines that the filtering criteria have not been met in step 218, that is a "no" decision, then in step 220 the eNB/RNC "A" does not store the RLF report nor does it communicate it to a central network entity, such as an cSON server, MDT server, TCE, or operations and maintenance (O&M) server. Accordingly, by the end of the method 200 along this branch of FIG. 2, the RLF report has been filtered out and discarded.

If the eNB/RNC "A" determines that the filtering criteria have been met in step 218, that is a "yes" decision, then in step 222 the eNB/RNC "A" stores the RLF report and communicates it to the central network entity. Accordingly, by the end of the method 200 along this branch of FIG. 2, the RLF report has not been filtered out and has been sent to an appropriate entity for processing.

If in step 214 it is determined that the RLF did not occur in a cell under the control of eNB/RNC "A", that is a "no" decision, then in step 224 the eNB/RNC "A" forwards the RLF report to the eNB/RNC which was identified in step 212, that is eNB/RNC "B". Once the eNB/RNC "B" has received the RLF report, it applies filtering criteria to it in step 226. As discussed in the foregoing, a single filter criterion or a number of different filtering criteria may be applied. If the eNB/RNC "B" determines that the filtering criteria have not been met in step 228, that is a "no" decision, then in step 230 the eNB/RNC "A" does not store the RLF report nor does it communicate it to the central network entity. Accordingly, by the end of the method 200 along this branch of FIG. 2, the RLF report has been filtered out and discarded.

If the eNB/RNC "B" determines that the filtering criteria have been met in step 228, that is a "yes" decision, then in step 232 the eNB/RNC "B" stores the RLF report and communicates it to the central network entity. Accordingly, by the end of the method 200 along this branch of FIG. 2, the RLF report has not been filtered out and has been sent to an appropriate entity for processing.

It will be seen that in this embodiment, filtering is performed by the eNB/RNC where the connection failure occurred. However, this does not necessarily have to be the case and an embodiment will now be described with reference to FIG. 3 in which filtering is performed by the eNB/RNC that receives the RLF report from the UE.

Figure 3:
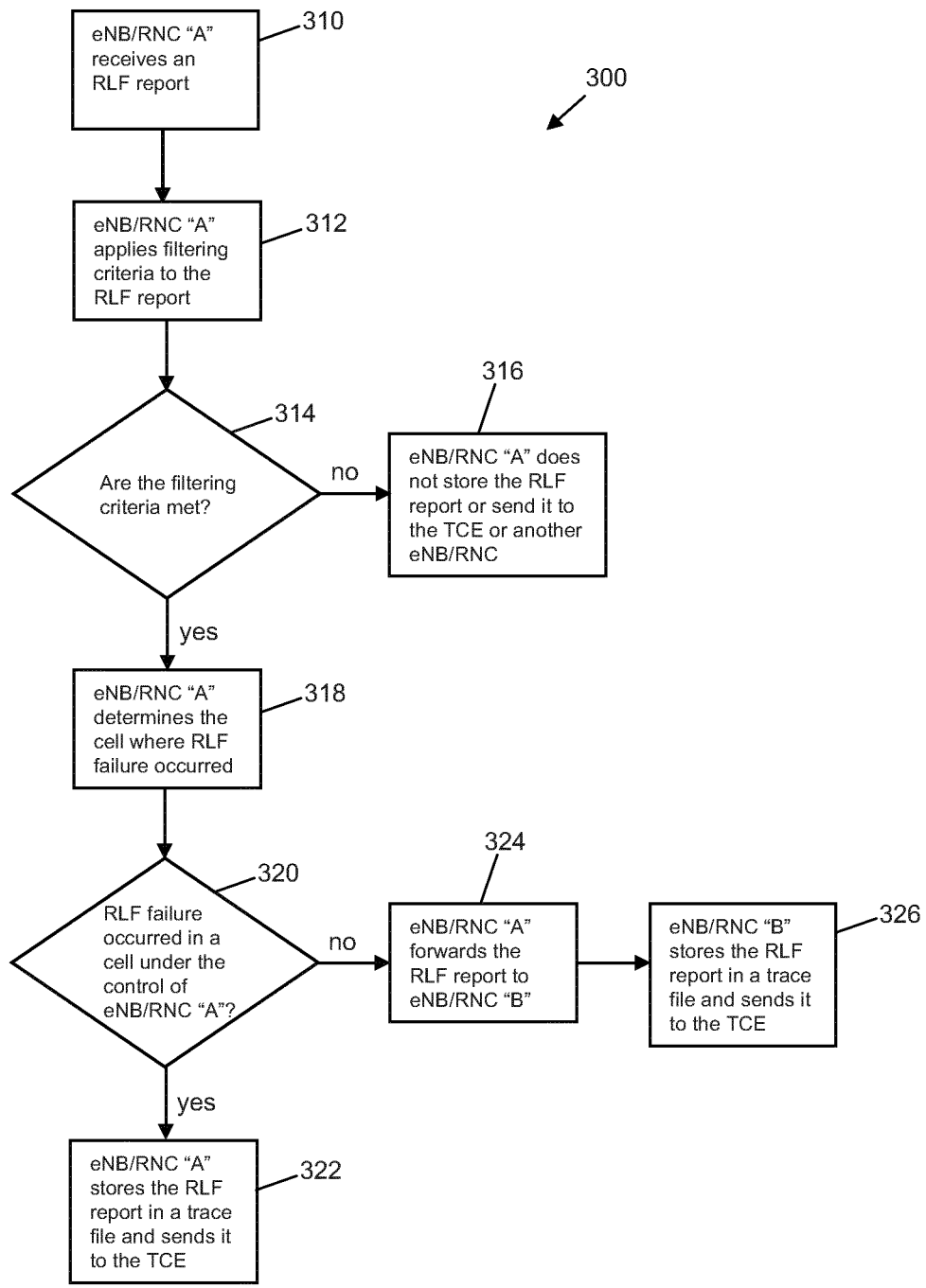
FIG. 3 illustrates a flow diagram of a method according to another embodiment.

FIG. 3 shows a method 300 involving a second eNB/RNC. According to this method, in step 310 an eNB/RNC "A" receives an RLF report, for example by retrieving it from an UE. In step 312, the eNB/RNC "A" applies filtering criteria to the RLF report. As discussed in the foregoing, a single filter criterion or a number of different filtering criteria may be applied. If the eNB/RNC "A" determines that the filtering criteria have not been met in step 314, that is a "no" decision, then in step 316 the eNB/RNC "A" does not store the RLF report nor does it communicate it to the central network entity or to another eNB/RNC. Accordingly, by the end of the method 300 along this branch of FIG. 3, the RLF report has been filtered out and discarded.

If the eNB/RNC "A" determines that the filtering criteria have been met in step 314, that is a "yes" decision, then in step 318 the eNB/RNC "A" determines the cell where RLF indicated by the RLF report occurred. The eNB/RNC "A" uses the determination of step 318 in step 320 to determine whether the RLF occurred in a cell under the control of eNB/RNC "A". If it is determined that the RLF did occur in a cell under the control of eNB/RNC "A", that is a "yes" decision, then in step 322 the eNB/RNC "A" stores the RLF report and communicates it to the central network entity. Accordingly, by the end of the method 300 along this branch of FIG. 3, the RLF report has not been filtered out and has been sent to an appropriate entity for processing.

If in step 320 it is determined that the RLF did not occur in a cell under the control of eNB/RNC "A", that is a "no" decision, then in step 324 the eNB/RNC "A" forwards the RLF report to the eNB/RNC which was identified in step 318, that is eNB/RNC "B". Once the eNB/RNC "B" has received the RLF report, then in step 326 the eNB/RNC "B" stores the RLF report and communicates it to the central network entity. Accordingly, by the end of the method 300 along this branch of FIG. 3, the RLF report has not been filtered out and has been sent to an appropriate entity for processing.

As can be seen from the foregoing embodiments, filtering relates to a store/send operation independent from the procedure of sending (forwarding) an RLF report to the eNB/RNC where the failure occurred. However, there does not necessarily have to be such a clear-cut separation as will now be described.

An embodiment of the invention may be arranged so that, by applying filtering criteria, the following two possibilities may result:
a) an eNB/RNC does not store/send the RLF report to the central network entity and the procedure ends, that is the eNB/RNC also does not attempt to forward the RLF report to the cell where connection failure occurred; and/or
b) an eNB/RNC does not store/send the RLF report to the central network entity, and the procedure continues to the next step, that is the eNB/RNC determines the cell where the RLF occurred.

Although there may be embodiments of the invention in which there is one implementation applying to possibility a) but not possibility b) and another implementation applying to possibility b) but not possibility a), there can be an embodiment in which an eNB/RNC can support both possibilities a) and b). In this case, the eNB/RNC is able to make a decision about whether either a) happens or b) happens. This may apply in a case in which different filtering criteria are used for each of the possibilities a) and b).

It should be noted that in possibility b) the eNB/RNC determines the cell where RLF occurred after not storing/sending the RLF report to the central network entity. This can apply in a case, for example, of an RLF report being Release 9 and relating to a failure occurring under the control of another eNB/RNC and so the RLF report is forwarded to that other eNB/RNC in order for it to be processed.

In such an embodiment, there can be at least two criteria applied to the RLF report, one being the "protocol release version of the RLF report" and the other being a different criterion or criteria. With there being at least two criteria, although both criteria may be applied at the first eNB/RNC, there can be a variant of the invention in which the "protocol release version of the RLF report" is applied at the first eNB/RNC and at least one of the different criteria is applied at the other eNB/RNC.

It should be noted that both possibility a) and possibility b) may be carried out with only a single filtering criterion being applied.

There may be other possibilities, for example including RLF reports being stored/sent to the central network entity but not forwarded to another eNB/RNC, RLF reports being forwarded to another eNB/RNC but not stored/sent to the central network entity, and RLF reports being stored/sent to the central network entity and forwarded to another eNB/RNC.

It will be understood that there may be other embodiments. Filtering may apply to either "store/send to TCE" or "forward to eNB/RNC where failure occurred" by using, for example, a filter attribute. There may be collection of RLF reports (for OAM purposes) from either a retrieving eNB/RNC or an eNB/RNC where failure occurred. This may occur by using a collection job configuration parameter.

In one embodiment of the invention, a configuration may be applied for there to be multiple collection jobs in a network. For example "Job_1" in a portion of the network where there is an eNB/RNC "A", "Job_2" in a portion of the network where there is an eNB/RNC "B". Job_1 may specify "collect RLF reports at retrieval, Rel-10 only collection filter, forwarding filter", and Job_2 may specify "collect RLF reports in the eNB/RNC where failure occurred, RSSI in the range below X collection filter, no forwarding filter". With such a configuration, an Rel-10 RLF report of a failure occurring at the eNB/RNC "B" retrieved by the eNB/RNC "A" will be first "filtered IN" and sent to the central network entity by the eNB/RNC "A", then forwarded to the eNB/RNC "B", where it will be either "filtered IN" or "filtered OUT" based on the value of the RSSI attribute and similarly either stored/sent to the central network entity or not. It should be understood that the order of the steps outlined in the foregoing may be different, for example forward RLF reports to the eNB/RNC "B" before sending to the central network entity, or both steps may be performed at substantially the same time.

In a variant of the invention, where an RLF report is forwarded, either the sending eNB/RNC or the receiving eNB/RNC may store the RLF report in an OAM log.

Embodiments of the invention are not limited to these examples, and other examples are possible.

Figure 4:
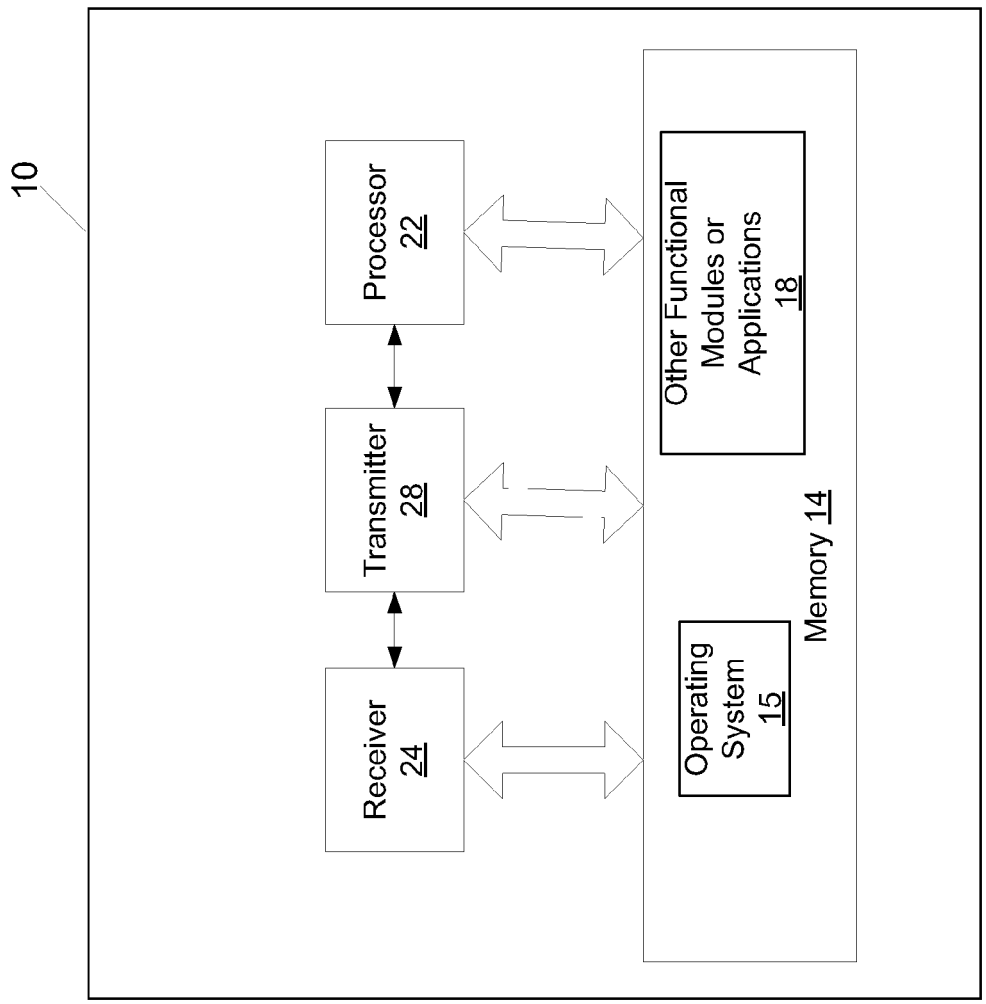
FIG. 4 illustrates an apparatus according to one embodiment.

FIG. 4 illustrates an apparatus 10 configured to execute RLF reporting, in accordance with one embodiment. In one embodiment, the apparatus 10 may be the eNB/RNC 102 shown in FIG. 1. The apparatus 10 includes a processor 22 for processing information and executing instructions or operations. The processor 22 may be any type of general or specific purpose processor. While a single processor 22 is shown in FIG. 4, multiple processors may be utilized according to other embodiments.

The apparatus 10 further includes a memory 14, coupled to the processor 22, for storing information and instructions to be executed by the processor 22. The memory 14 can be comprised of any combination of random access memory ("RAM"), read only memory ("ROM"), static storage such as a magnetic or optical disk, or any other type of non-transitory machine or computer readable media.

The apparatus 10 may further include a transmitter 28 for transmitting information, such as data and/or control signals. The apparatus 10 also includes a receiver 24 for receiving information including data and/or control signals. In some examples, the receiver and transmitter functionality may be implemented in a single transceiver unit.

In an embodiment, the memory 14 stores software modules that provide functionality when executed by the processor 22. The modules may include an operating system 15 that provides operating system functionality for the apparatus 10. The memory may also store one or more functional modules 18, such as an application or program, to provide additional functionality for the apparatus 10. The components of the apparatus 10 may be implemented in hardware, or as any suitable combination of hardware and software.

In one embodiment, the memory 14 and the computer program code stored thereon may be configured, with the processor 22, to cause the apparatus 10 to receive RLF data related to a connection failure experienced by a UE. The apparatus 10 may then be caused to determine whether the RLF data satisfies at least one condition and, based at least in part on the determination that the RLF data satisfies the at least one condition, send the RLF data to at least one of a second radio access node and an RLF data collection entity.

Figure 5:
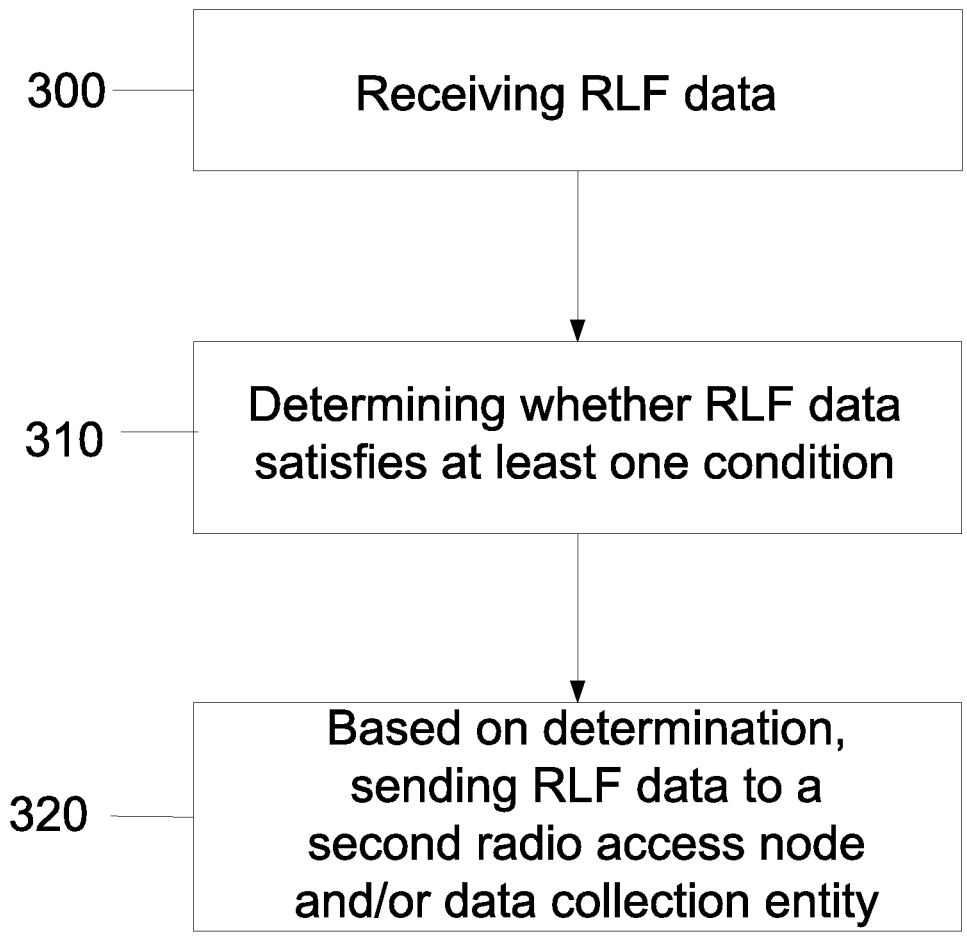
FIG. 5 illustrates a flow diagram of a method according to yet another embodiment.

FIG. 5 illustrates a flow diagram of a method for collecting RLF data in a wireless network, according to one embodiment. In some embodiments, the method illustrated in FIG. 5 may be performed by the apparatus 10 discussed above in connection with FIG. 4. The method includes, at 300, receiving RLF data related to a connection failure experienced by a UE. In one embodiment, the RLF data may be received by a first radio access node in the wireless network. The method may then include, at 310, determining whether the RLF data satisfies at least one condition. Then, at 320, based at least in part on the determination that the RLF data satisfies the at least one condition, the method may include sending the RLF data to at least one of a second radio access node and an RLF data collection entity. In one embodiment, the RLF data may be received from another radio access node or the UE.

In some embodiments, the functionality of the flow diagram of FIG. 5, or that of any other method described herein, may be implemented by a software stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Thus, another embodiment of the invention includes a computer program embodied on a computer readable medium. The computer program is configured to control a processor to perform a process. The process includes receiving RLF data related to a connection failure experienced by a UE, determining whether the RLF data satisfies at least one condition, and, based at least in part on the determination that the RLF data satisfies the at least one condition, sending the RLF data to at least one of a second radio access node and an RLF data collection entity.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method for collecting radio link failure data in a wireless network, the method comprising:
   receiving, by a first radio access node, radio link failure data related to a connection failure experienced by a user equipment on a radio link between the user equipment and a radio access node;
   determining, using information contained in the radio link failure data, whether the radio link failure data satisfies at least one filtering condition wherein the at least one filtering condition comprises at least one of: a presence of detailed location information in the radio link failure report, a protocol release version of the radio link failure report, a signal strength of non-serving cells above/below a threshold, a carrier frequency of a last serving cell, PLMN or TAI of the last serving cell, a specific attribute of the radio link failure report is above/below a threshold, and
   when it is determined that the radio link failure data satisfies the at least one filtering condition, sending the radio link failure data to at least one of a second radio access node and a radio link failure data collection entity.

2. The method according to claim 1, wherein the radio link failure data is received from one of a second radio access node or the user equipment.

3. The method according to claim 1, wherein the radio link failure data collection entity comprises one of a cSON server, TCE, MDT server, or NMS.

4. The method according to claim 1, further comprising configuring the at least one condition by an O&M server.

5. The method according to claim 1, wherein, when it is determined that the radio link failure data does not satisfy the at least one condition, the radio link failure data is not sent to the radio link failure data collection entity.

6. An apparatus, comprising:
   at least one processor; and
   at least one memory including computer program code,
   the at least one memory and the computer program code configured, with the at least one processor, to cause the apparatus at least to
   receive radio link failure data related to a connection failure experienced by a user equipment on a radio link between the user equipment and a radio access node;
   determine using information contained in the radio link failure data, whether the radio link failure data satisfies at least one filtering condition wherein the at least one filtering condition comprises at least one of: a presence of detailed location information in the radio link failure report, a protocol release version of the radio link failure report, a signal strength of non-serving cells above/below a threshold, a carrier frequency of a last serving cell, PLMN or TAI of the last serving cell, a specific attribute of the radio link failure report is above/below a threshold, and
   when it is determined that the radio link failure data satisfies the at least one filtering condition, send the radio link failure data to at least one of a second radio access node and a radio link failure data collection entity.

7. The apparatus according to claim 6, wherein the at least one memory and the computer program code are further configured, with the at least one processor, to cause the apparatus to receive the radio link failure data from one of a second radio access node or the user equipment.

8. The apparatus according to claim 6, wherein the radio link failure data collection entity comprises one of a cSON server, TCE, MDT server, or NMS.

9. The apparatus according to claim 6, wherein the at least one condition is configured by an O&M server.

10. A communications system comprising the apparatus of claim 6 and at least one of a second radio access node and a radio link failure data collection entity.

11. A computer program, embodied on a non-transitory computer readable medium, the computer program configured to control a processor to perform a process, comprising:
    receiving, by a first radio access node, radio link failure data related to a connection failure experienced by a user equipment on a radio link between the user equipment and a radio access node;
    determining, using information contained in the radio link failure data, whether the radio link failure data satisfies at least one filtering condition wherein the at least one filtering condition comprises at least one of: a presence of detailed location information in the radio link failure report, a protocol release version of the radio link failure report, a signal strength of non-serving cells above/below a threshold, a carrier frequency of a last serving cell, PLMN or TAI of the last serving cell, a specific attribute of the radio link failure report is above/below a threshold, and
    when it is determined that the radio link failure data satisfies the at least one filtering condition, sending the radio link failure data to at least one of a second radio access node and a radio link failure data collection entity.

12. The computer program according to claim 11, wherein the radio link failure data is received from one of a second radio access node or the user equipment.

13. The computer program according to claim 11, wherein the radio link failure data collection entity comprises one of a cSON server, TCE, MDT server, or NMS.

14. The computer program according to claim 11, further comprising configuring the at least one condition by an O&M server.

15. The computer program according to claim 11, wherein when it is determined that the radio link failure data does not satisfy the at least one condition, the radio link failure data is not sent to the radio link failure data collection entity.

* * * * *